United States Patent
Vincent

(10) Patent No.: US 8,102,881 B1
(45) Date of Patent: Jan. 24, 2012

(54) STREAMLINED GUEST NETWORKING IN A VIRTUALIZED ENVIRONMENT

(75) Inventor: Pradeep Vincent, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 177 days.

(21) Appl. No.: 12/555,491

(22) Filed: Sep. 8, 2009

(51) Int. Cl.
 *H04J 3/24* (2006.01)
(52) U.S. Cl. ...................................................... 370/474
(58) Field of Classification Search .......... 370/229–231, 370/235, 351, 394, 395.5–395.52, 463–477
See application file for complete search history.

(56) References Cited

U.S. PATENT DOCUMENTS 7,796,646 B2 * 9/2010 Das et al. ...................... 370/474

OTHER PUBLICATIONS

Viswanathan, Virtualization with XEN, University of Southern California, 21 pages, 2007.*

* cited by examiner

*Primary Examiner* — Frank Duong
(74) *Attorney, Agent, or Firm* — Novak Druce + Quigg LLP

(57) ABSTRACT

Networking speed in a virtualized environment can be improved by utilizing an enhanced protocol and parallel stack to bypass restrictions of a conventional network stack that complies with standard networking protocols. In one embodiment, an enhanced TCP protocol enables large packets received from a guest application to bypass the guest networking stack and be received to a bottom conversion layer of the enhanced stack, which is able to segment the packet into appropriately sized segments that conform to the conventional protocol. These segments can be passed to a network interface card (NIC) or other device for encapsulation, framing, or other such processing to be transmitted to the destination as Ethernet frames or other such packets.

25 Claims, 6 Drawing Sheets

STREAMLINED GUEST NETWORKING IN A VIRTUALIZED ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific hardware resources. Such access comes with risks for providers of those resources, however, as in a cloud or other shared environment there typically will be other users sharing those resources at various times, and a modification of the resource by one user can potentially be detrimental to subsequent users. In cases where users have a virtual address space, such that the customer network functions as a single virtual network without the restrictions or additional addresses of one or more additional physical networks, it can be desirable to provide for the processing and routing of packets pertaining to this virtual address space. Virtualization often comes with additional overhead, however, as packet processing must be performed at various levels of the network stack. Further, the packets must conform to the restrictions and regulations of the transmission protocol, which can greatly decrease the performance of the system.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing resources in an electronic environment. In various embodiments, users are provided with full or substantially full or "native" access to one or more hardware resources in a network, cloud, or other shared environment. In other embodiments, users have access to only one or more devices or components, such as a network interface card (NIC) graphics processing unit (GPU) on a peripheral component interconnect (PCI) bus, on a host machine. In situations where the users having access to such a resource can change frequently, it can be desirable to prevent users from modifying, or at least or at least track or act upon the attempted modifying, of firmware or other configuration or processing information for the resource, which can affect an ability of a subsequent user to effectively or securely utilize the resource.

Systems and methods in accordance with various embodiments can improve networking speed in a virtualized environment by utilizing an enhanced protocol and parallel stack to bypass restrictions of a conventional network stack that complies with standard networking protocols. In one embodiment, an enhanced TCP protocol enables large packets received from a guest application to bypass the guest networking stack and be received to a host layer, upon which the guest OS is provisioned. The host, or a device on the host, is able to segment the packet into appropriately sized segments that conform to the conventional protocol, thereby leveraging the capabilities of the hardware and bypassing work at the various network layers of the guest. These segments then can be passed to a network interface card (NIC) or other device for encapsulation or other such processing to be transmitted to the destination as Ethernet frames or other such packets. Various other such processes can be performed within the scope of the various embodiments as disclosed and suggested herein.

Figure 1:
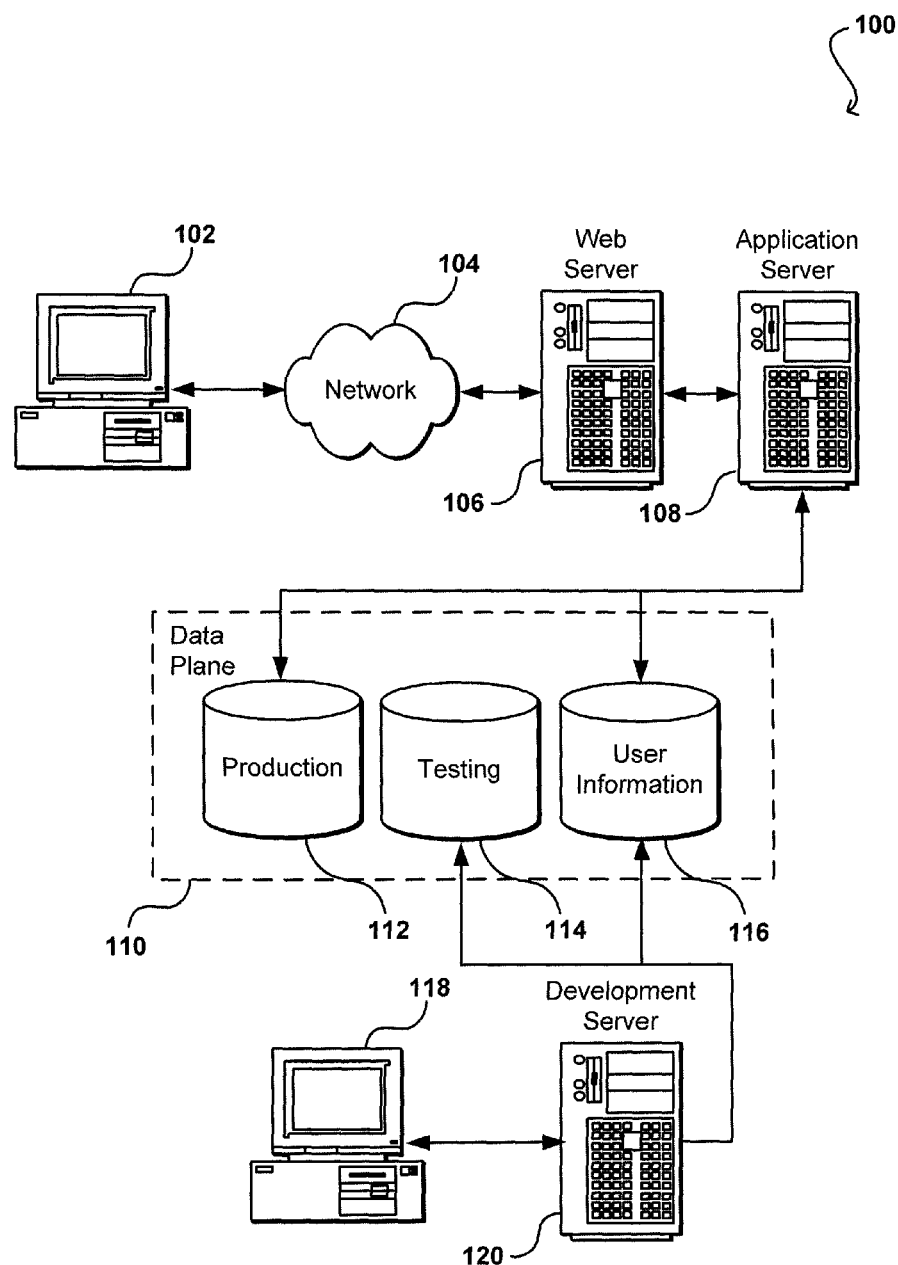
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
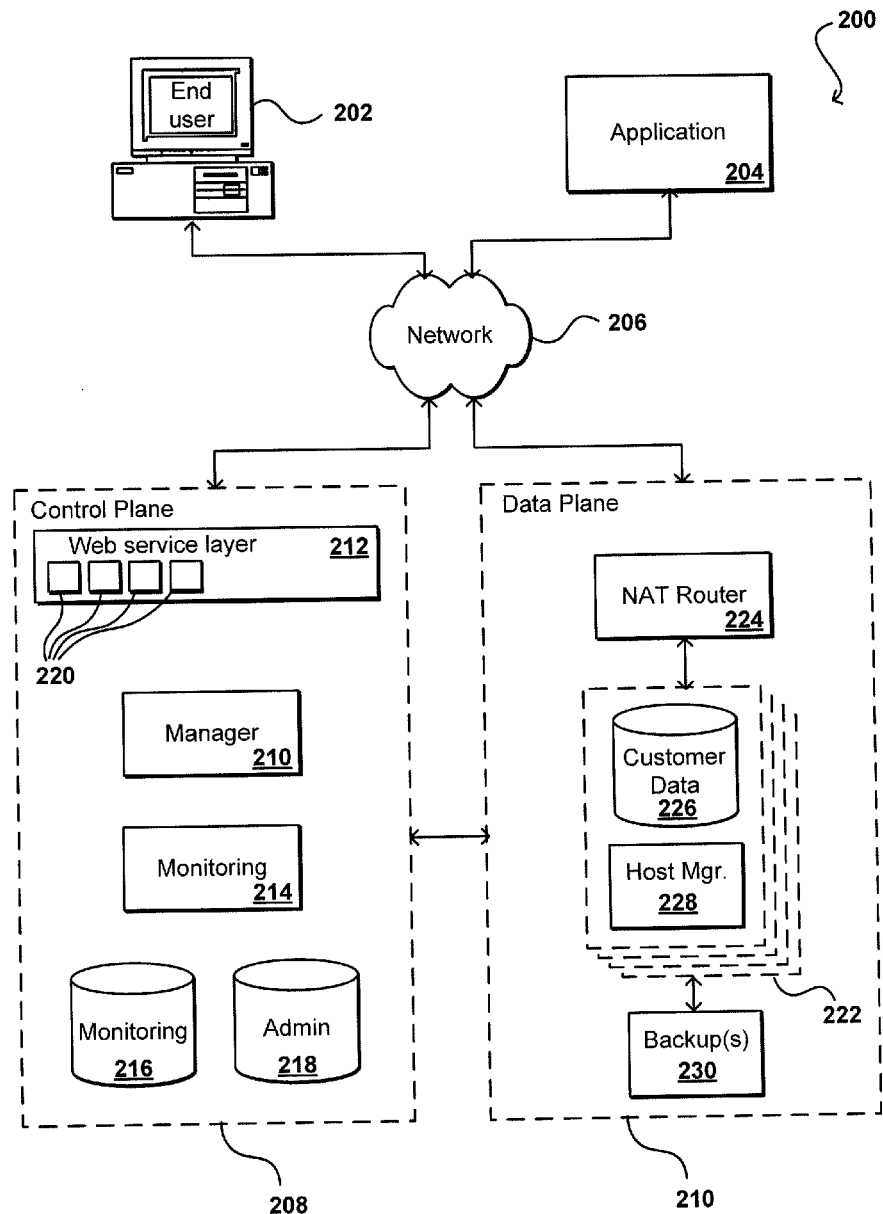
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a DNS address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the DNS address and a port address to be used to access a resource. A user then can access the resource directly using the DNS address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Systems and methods in accordance with various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain appliance hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Systems and methods in accordance with various embodiments can provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting an running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the host or its device(s). In the case of dynamically configurable settings for a virtual machine monitor (VMM) managed by a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard firmware or chipset configurations. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, are known to address various issues specific to device firmware, entire hosts, and other such hardware aspects.

Figure 3:
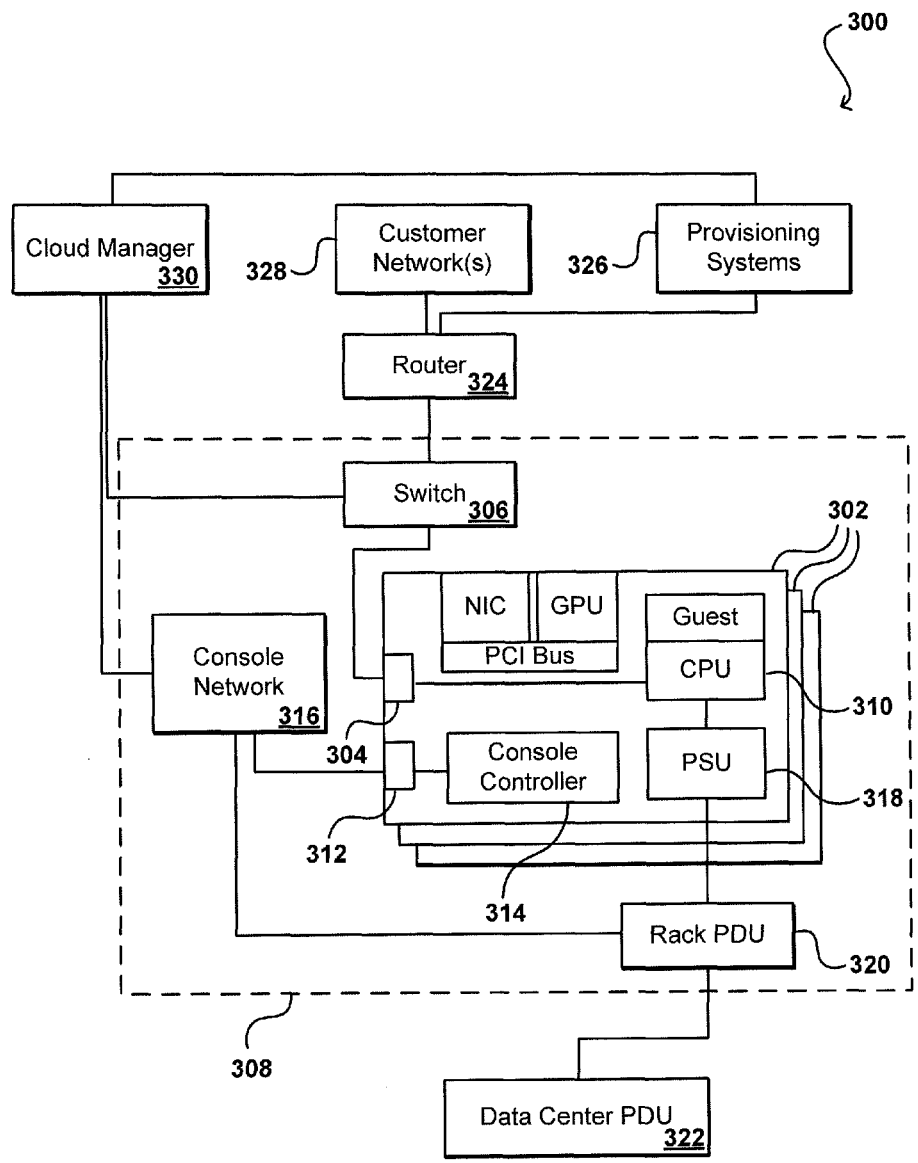
FIG. 3 illustrates a configuration for accessing specific hardware resources that can be used in accordance with one embodiment.

Systems and methods in accordance with various embodiments can prevent and/or monitor the access and/or manipulation of firmware images or configuration information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware (including based on different bus technologies or with greater or lesser degrees of system integration within individual components or "chips"), software, and protocols currently used or subsequently developed for such purposes.

This example configuration 300 includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host network traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. PXE access could also be enabled or disabled depending on the type of reboot that has been authorized. For example, reboots could be allowed from local images on the host for customer initiated reboots, but PXE access can be disabled upstream. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

Figure 4:
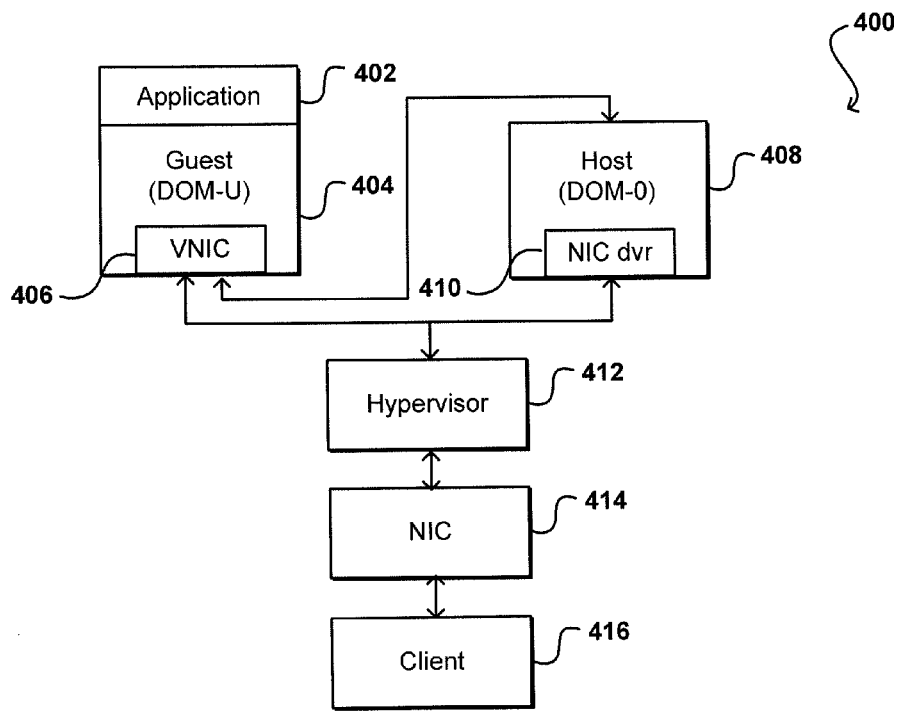
FIG. 4 illustrates an example transmission architecture that can be used in accordance with one embodiment.

As discussed, it can be desirable to provide a level of virtualization for customers provisioned on hardware devices and/or host machines in a cloud or other such networked environment. One such virtualization technology can be implemented at least in part using a virtual machine monitor such as the Xen® hypervisor developed by the open source Xen project. FIG. 4 illustrates an example of an architecture 400 that can take advantage of a technology such as Xen in accordance with various embodiments. In a Xen-based system, for example, the hypervisor layer 412 functions as the lowest and most privileged layer, here shown under the guest layer 404 and the host layer 408, whereby the hypervisor can distribute or schedule tasks across processing units of the host machine. In Xen terminology, a first guest OS or host layer 408 having direct access to the underlying hardware is referred to as domain 0 (DOM-0), which can be booted automatically with the hypervisor and granted management and other such privileges. Any additional guest OS layers 404, sitting on top of the hypervisor layer 412, are referred to as domain U (DOM-U) in Xen terminology. When implementing such an architecture, the DOM-0 host hypervisor kernel can first be installed and configured, followed by any DOM-U guest kernels, after which a Xen guest OS can be created and configured as many be managed by a cloud manager and/or provisioning system as discussed elsewhere herein. In some embodiments, any operating system can be utilized and/or modified to function as a DOM-U guest operating system. It should be noted that Xen-based technology and terminology is used for purposes of explanation as an example, but that other technologies can be used within the scope of the various embodiments.

Such an architecture can enable the guest OS to communicate efficiently with the underlying hardware. During such communications, the guest 404 communicates with the host 408, or the DOM-U communicates with the DOM-0. For virtualization purposes, the hypervisor 412 or the TCB (trusted computing base) can be used to control the hardware device. The guest OS can have one or more applications 402 (e.g., Web server applications) running on top of the guest OS, which can be programmed to send network data to another client device 414 which may be outside the cloud or other networked environment. When transmitting packets outside the network, such as over an Ethernet connection, it can be necessary in at least some embodiments to determine the maximum size packet that can be transmitted to the client. For example, if at least one of the points along the transmission path can only handle 1.5 KB packets, then the packets must be segmented into packets sized according to the lowest "maximum" size along that path. The guest OS and/or host might specify that the smallest maximum size be used by default such that the segmented packets or Ethernet frames are not bounced back or otherwise be rejected due to exceeding size constraints. Typically the guest operating system is responsible for building information up to the layer three IP packets. The operating system also can frame the packets as Ethernet frames, such as by adding a MAC header, etc. In some embodiments the NIC can handle IP datagram and TCP/UDP segments. In some embodiments, the NIC can manage or perform at least a portion of the packetizing protocol, such as for segmentation offloading, which can be performed in the hardware by the NIC instead of the software in the guest OS.

The NIC can expose segmentation offload capabilities to the DOM-0, which in turn exposes a virtual network interface (VNIC) (and segmentation offload capabilities) to the Dom-U. A large segment that is forwarded by DOM-U for transmission can be passed to the NIC by the DOM-0 as long as the NIC supports segmentation offload. If the NIC does not support segmentation offload and the VNIC exposes segmentation offload support, then when the DOM-U transmits a large segment, the DOM-0 typically will have to packetize the segment before sending the packets to the NIC. The host can query the NIC (or another appropriate component) to determine the maximum packet size that can be supported, although sometimes a NIC driver 410 in the host can store the size restrictions. The host 408 can determine the packet sizes that can be handled downstream, and can segment network data according to the maximum size packet that can be handled.

Conventional network protocol formats and rules for transmitting packets of information in such a system are based upon factors such as physical media limitations, network fabric characteristics, and in some cases outdated legacy reasons. For example, when a host network stack transmits network data, the network data typically needs to be segmented and/or packetized based at least in part upon the capabilities of the physical network interface. In conventional networks, the network data is segmented into level four (of the network stack) segments or packetized into Ethernet frames before transmission to a physical network interface such as a NIC. Unless the NIC supports an segmentation offload feature or other similar protocol offload feature, the host network stack has to packetize the network data into Ethernet frames before transmitting the data to the NIC. In certain conventional networks, Ethernet frames and level four segments are typically restricted to particular maximum sizes. Ethernet frames have both a header and a footer added (by one or more Ethernet components) to frame the payload, such that the actual payloads must be even smaller than these size restrictions.

In an example of a regular TCP stack, packets are constructed as segments of only up to 64 KB in length, such as where a network interface supports segmentation offload or a similar technology, or a maximum length of 1.5K or 9K, depending upon factors such as the maximum transmission unit (MTU) of the network interface or path MTU of the network path. The packet further must include TCP-related information such as sequence numbers, TCP ACK numbers, packet length, and port numbers. The packet is passed to the IP layer and Ethernet driver of a convnentional network stack, and transported across a Xen or similar networking layer. The Xen network backend driver can receive the packet, which can be transmitted across a software bridge, software tunnel, and/or software router and finally transmitted to the network interface, such as by a NIC driver.

Even in a typical network setup of a virtual server environment, the virtual network interface has the same protocol semantic rules and format restrictions as a physical network interface. The virtual network interface backend eventually transmits the network data to physical NIC after the network stack traversal that might include bridging, routing, tunneling, firewall traversals and other forms of network stack traversals. The per-packet (frame or segment) processing overhead thus is significantly higher in a virtual host networking setup due to virtualization layer traversal, as well as numerous additional network stack component traversals.

The need to utilize the smallest maximum packet size in various embodiments thus can result in various inefficiencies. For example, the need to send a large number of small packets can reduce/impact the throughput or networking speed relative to sending a smaller number of large packets, as the overhead of network stack traversal tends to be proportional to the number of packets, rather than the amount of data transmitted. Further, there are a number of levels in the network stack through which these packets must be sent, such that the additional overhead can significantly affect the throughput or processing speed of the network. Also, one of the fundamental problems with the virtualization of network stacks is that the virtualizing process is expensive because certain tasks or work has to be performed, undone, and then essentially redone at different layers. It thus can be desirable to utilize a smaller number of packets as long as possible through the network stack, and segment the packets at the last possible moments in order to reduce overhead and leverage various hardware efficiencies. Reducing the number of packets to be transmitted also can improve network I/O performance and reduce CPU consumption associated with network I/O processing. Further, while compliance with protocol semantic rules and format restrictions are essential when dealing with conventional networking hardware (e.g., a NIC, switch, and/or router), such compliance is not essential when transmitting from a guest network stack to DOM-0 and through the DOM-0 network stack.

Further, in an example where a guest layer segments the payload into 1.5 KB packets and the DOM-0 performs encapsulation or a similar process, the resulting frames could exceed the 1.5 KB limits of the NIC such that an additional 20 bytes or so of additional encapsulation information can cause each packet to be divided into two packets, effectively leading to a factor of two slowdown in the network.

Systems and methods in accordance with various embodiments can address these and other issues relating to network protocol rules and restrictions by utilizing an enhanced protocol at or below layer three or four in the network stack for a guest operating system (OS) provisioned on a host machine or other such device. An enhanced protocol in various embodiments can allow segments or payloads of much larger size to be transmitted through the network stack to the level of the physical interface, where a conversion or adaptation layer can perform segmentation and/or framing shortly before the segments are passed to the interface. Various embodiments can utilize a specialized protocol that does not require communicating in relatively small data packets, such as 1.5 KB packets or 64 KB packets, for example, but can indicate to an application layer protocol or other such higher-layer protocol that information can be sent in larger data packets. The large data packets can be transmitted along a path that bypasses the entire network stack in the guest while following the usual level four protocol rules in "spirit," but not in exact semantics and/or syntax. Data then can be transmitted in a way that does not have to follow all the rules and restrictions of a conventional network stack, such as a 64 KB limit enforced by conventional TCP and UDP.

In one embodiment utilizing a parallel network stack for an enhanced TCP protocol, packets can be constructed following the spirit of TCP protocol semantics but violating segment length restriction. For example, packets can be constructed that are of a size that is much larger than otherwise allowed by conventional TCP, such as a size of 2 MB or larger. Each packet can have a reference to the TCP payload, but the TCP header in various embodiments is not formed in a conventional sense but instead maintained as part of a separate metadata section that includes TCP-related information such as sequence numbers, TCP ACK numbers, packet length, port numbers, etc., as discussed above. In such an example, the packet can be passed to the IP layer and the Ethernet driver, and then transmitted across the Xen networking layer. In some embodiments, Xen networking also can be enhanced to be aware of the enhanced protocol, while the physical network interface may not be aware of the enhanced protocol packet format. The Xen network backend driver can receive the packet, which then can be transmitted across software bridge, software tunnel and/or software router. A TCPE adaptation or conversion layer can convert the very large TCPE packets into TCP segments that the network interface driver and physical network interface can understand and process. The resulting Ethernet frames then can be transmitted as before, using conventional approaches. Using such an approach, overhead related to the guest OS network stack, virtual network interface, address space translation, stateless and stateful firewalling, a guest network stack can be reduced significantly, although other reductions are possible in other embodiments.

Figure 5:
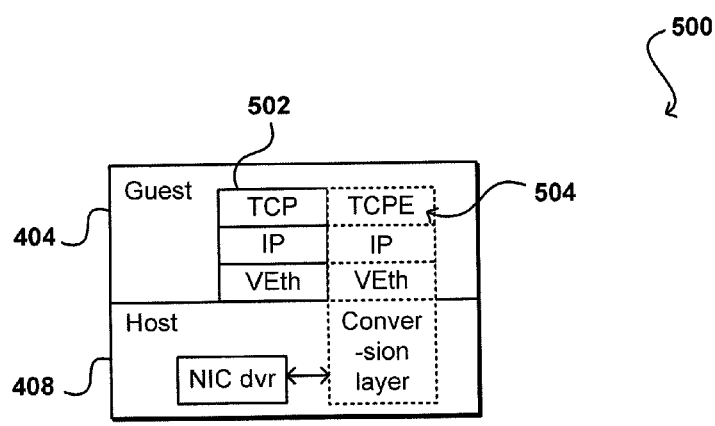
FIG. 5 illustrates a portion of a transmission architecture such as that illustrated in FIG. 4.

In various embodiments, an Internet protocol (IP) driver and/or a TCP driver can be included in the guest OS layer 404 that supports the special enhanced or "virtualization-aware" protocol, and can support high-speed networking. The use of such protocols can be transparent to customers interacting with networking layers above layer four in the network stack. As illustrated in the example architecture 500 of FIG. 5, the guest 404 also can have a conventional guest kernel networking stack 502, which can include layers such as the TCP, IP, and virtual Ethernet (VEth) layer. The guest networking stack also can include other layers or components, such as for bridging, routing, tunneling, firewall traversals and other forms of network stack traversals. Using the enhanced protocol, however, a parallel network stack 504 can be created that takes advantage of the added flexibility of TCPE or another such enhanced protocol. The TCPE can follow many of the basic rules and regulations of TCP, such as sequence numbers and error recovery, but can allow for larger packets and other such aspects that can provide for enhanced performance. The rules and regulations will eventually have to be followed in many embodiments, however, as a TCPE packet does not follow the basic TCP format and thus cannot be propagated along an Ethernet path. For example, even if 1 MB packets can be transmitted through layers of the network stack to the host, restrictions such as 64 KB packet size restrictions still need to be followed before transmitting to the physical network device and across a network to a client device, for example.

The parallel TCPE stack can be used to transmit larger packets of network data from an application on the guest OS 404 to a NIC driver or similar component in the host 408, bypassing layers of the conventional guest network stack 502. Since a conventional NIC will not be able to recognize larger segments or frames, the high performance or enhanced side network stack 504 can transmit the larger packets as long as possible, and perform segmentation and/or framing right before the data reaches the NIC driver. In example of FIG. 5, the application payload at the top of the stack can be a large file or video stream that can be sent in large chunks, such as 10 KB-1 GB chunks of data. Eventually the data will be passed onto the wire as 1.5 KB or 9 KB Ethernet packets, for example, but as discussed it can be desirable to perform the segmentation as late in the process as possible to reduce the overhead and leverage as much of the hardware mechanisms as possible.

Figure 6:
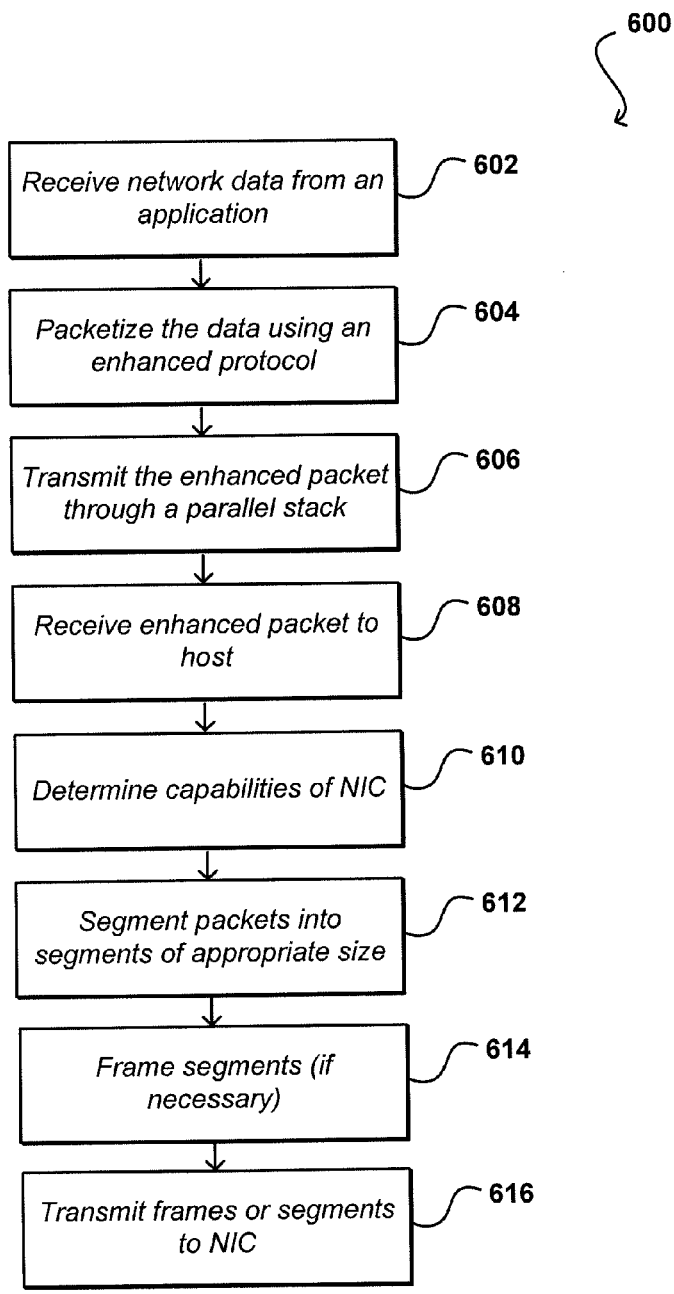
FIG. 6 illustrates an example of a first process for processing packets that can be used in accordance with various embodiments.

FIG. 6 illustrates an example of one such process 600 for bypassing the guest network stack restrictions that can be used in accordance with various embodiments. In this example, a large amount of network data is received from an application, "sitting" on top of a guest operating system (OS), to the guest OS 602. A "large" amount as used herein can refer to a size larger than could be transmitted using the standard network stack of the guest OS. The network data can be packetized and/or formatted using an enhanced transmission protocol 604, such as TCPE. The enhanced packet can be transmitted through a parallel stack or channel (including IP, Veth, bridging, tunneling, and/or routing layers, for example) to a host device 606, where the parallel enhanced stack is outside the conventional guest network stack. The enhanced packets are received to the host device 608, such as to an adaptation or conversion layer of the enhanced stack, which is able to determine the transmission capabilities and/or restrictions of the physical network interface (e.g., the NIC) 610. The large enhanced packet can be segmented at the adaptation layer into segments of a size that can be handled by the NIC 612. Depending on the type of NIC or other such aspects, the segments also can be framed 614 by the adaptation layer if necessary. The frames or segments then can be transmitted to the NIC for processing 616.

Figure 7:
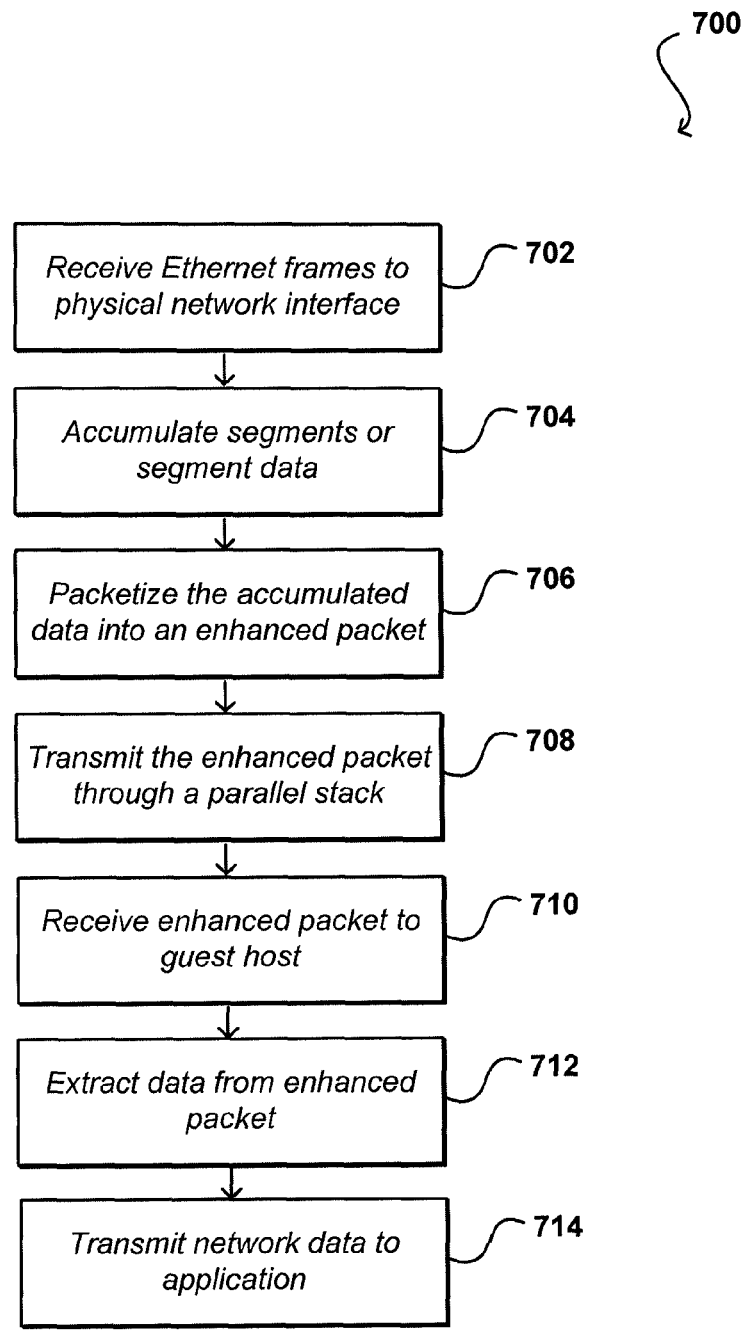
FIG. 7 illustrates an example of a second process for processing packets that can be used in accordance with various embodiments.

An enhanced protocol stack can similarly be utilized for Ethernet frames received from a client or other such source to the NIC or other physical network interface. FIG. 7 illustrates an example of one such process 700 for bypassing the guest network stack restrictions for frames received from across a network that can be used in accordance with various embodiments. In this process, several Ethernet frames are received to a physical network interface, such as a NIC 702. Depending upon the type of NIC or other such factors, segments can be accumulated at the NIC or at the conversion layer of the enhanced stack 704. Once the accumulated segments are received to the conversion or adaptation layer of the enhanced stack, the accumulated data can be packetized into an enhanced packet 706. The enhanced packet can be received through the parallel enhanced stack 708 (including IP, Veth, bridging, tunneling, and/or routing layers, for example) to be received by a guest host 710. At the guest host, the data can be extracted from the enhanced packet 712 and the network data can be transmitted to an application sitting on the guest host 714. As should be apparent in light of the present disclosure, additional, fewer, or alternative steps of various processes discussed herein can be performed in similar or alternative orders, and sometimes concurrently, within the scope of the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for processing data packets in an electronic environment, comprising:

under control of one or more computer systems configured with executable instructions, receiving network data from an application to a guest operating system within a virtual environment executing on a host machine;

packetizing the network data using an enhanced transmission control protocol (TCP) enabling the network data to be transmitted through an enhanced network stack of the host machine using a larger packet size than can be transmitted using conventional TCP;

transmitting the packet through the network stack of the host device using the enhanced network stack and bypassing a conventional network stack, transmitting of the packet using the enhanced network stack adhering to rules laid out by at least one conventional transmission protocol while violating at least one of semantics or syntax for the conventional transmission protocol;

at a transmit-side conversion layer of the enhanced network stack, determining a maximum packet size that can be processed by a network interface card of the host device and segmenting the data packet into segments of at most the maximum packet size, the segments being formatted using conventional TCP; and forwarding the segments to the network interface card, the network interface card being operable to transmit the segments as Ethernet frames to an external location.

2. The computer-implemented method of claim 1, wherein the segments are framed as Ethernet frames at the transmit-side conversion layer or at the network interface card.

3. The computer-implemented method of claim 1, wherein determining a maximum packet size comprises contacting a discovery service for a transmission path.

4. A computer-implemented method for processing data packets in an electronic environment, comprising:

under control of one or more computer systems configured with executable instructions, receiving network data to a guest operating system (OS) within a virtual environment;

packetizing the network data using a first transmission protocol enabling the packet to be transmitted using a first packet size;

transmitting the packet using a first network stack corresponding to the first transmission protocol;

at a bottom transmit-side conversion layer of the first network stack, determining a second size corresponding to a size limit for a second transmission protocol and segmenting the data packet into segments of at most the second size, the segments being formatted using the second transmission protocol; and forwarding the segments to a network interface device operable to transmit the segments as Ethernet packets to an external location.

5. The computer-implemented method of claim 4, wherein the first protocol is an enhanced transmission control protocol (TCP) or an enhanced user datagram protocol (UDP), and wherein the second protocol is conventional TCP or conventional UDP.

6. The computer-implemented method of claim 5, wherein the segments are framed as Ethernet frames at the bottom transmit-side conversion layer or at the network interface card.

7. The computer-implemented method of claim 4, wherein the network data is received from an application executing on the guest operating system.

8. The computer-implemented method of claim 4, wherein determining a maximum packet size comprises contacting a discovery service for a transmission path.

9. The computer-implemented method of claim 4, wherein the host device corresponds to a hypervisor and the guest OS executes within a virtual machine effectuated by the hypervisor.

10. The computer-implemented method of claim 4, wherein the first packet size is greater than 64 KB and the second packet size is less than or equal to 64 KB.

11. A computer-implemented method for processing data packets in an electronic environment, comprising:

under control of one or more computer systems configured with executable instructions, receiving network data from an application to a guest operating system within a virtual environment executing on a host machine;

packetizing the network data using an enhanced transmission control protocol (TCP) enabling the network data to be transmitted through an enhanced network stack of the host machine using a larger packet size than can be transmitted using conventional TCP;

transmitting the packet through the network stack of the host device using the enhanced network stack and bypassing a conventional network stack, transmitting of the packet using the enhanced network stack adhering to rules laid out by at least one conventional transmission protocol while violating at least one of semantics or syntax for the conventional transmission protocol;

at a transmit-side conversion layer of the enhanced network stack, determining at least one protocol semantic that can be processed by a network interface card of the host device and modifying the data packet into one or more segments utilizing the at least one protocol semantic; and forwarding the segments to the network interface card, the network interface card being operable to transmit the segments as Ethernet frames to an external location.

12. A computer-implemented method for processing data packets in an electronic environment, comprising:

under control of one or more computer systems configured with executable instructions, receiving a plurality of Ethernet packets to a network interface device of a host machine;

forwarding data for the plurality of Ethernet packets to a bottom receive-side conversion layer of an enhanced network stack, wherein the bottom conversion layer aggregates and packetizes at least some of the data into an enhanced packet using an enhanced transmission control protocol (TCP) enabling the network data to be received through the enhanced network stack of the host machine using a larger packet size than can be received using conventional TCP;

receiving the enhanced packet through the network stack of the host machine using the enhanced network stack and bypassing a conventional network stack; and at the guest operating system receiving the packet through the enhanced network stack, extracting network data from the enhanced packet and transmitting the network data to an application.

13. The computer-implemented method of claim 12, further comprising:

removing framing of the Ethernet frames at the receive-side conversion layer or at the network interface card.

14. A system for processing data packets in an electronic environment, comprising:

a processor; and a memory device including instructions that, when executed by the processor, cause the processor to:

receive network data to a guest operating system (OS) within a virtual environment;

packetize the network data using a first transmission protocol enabling the packet to be transmitted using a first packet size;

transmit the packet using a first network stack corresponding to the first transmission protocol;

at a bottom transmit-side conversion layer of the first network stack, determine a second size corresponding to a size limit for a second transmission protocol and segment the data packet into segments of at most the second size, the segments being formatted using the second transmission protocol; and forward the segments to a network interface device operable to transmit the segments as Ethernet packets to an external location.

15. The system of claim 14, wherein the second protocol is a transmission control protocol (TCP) or a user datagram protocol (UDP).

16. The system of claim 14, wherein the data packet is received from an application executing on the guest operating system.

17. The system of claim 14, wherein the segments are framed as Ethernet frames at the bottom transmit-side conversion layer or at the network interface card.

18. The system of claim 14, wherein determining a maximum packet size comprises contacting a discovery service for a transmission path.

19. The system of claim 14, wherein segmenting the data packet into segments at the host device is performed at least in part using a driver for the network interface device.

20. A computer readable non-transitory medium storing instructions for processing data packets in an electronic environment, the instructions when executed by a processor causing the processor to:

receive network data to a guest operating system (OS) within a virtual environment;

packetize the network data using a first transmission protocol enabling the packet to be transmitted using a first packet size;

transmit the packet using a first network stack corresponding to the first transmission protocol;

at a bottom transmit-side conversion layer of the first network stack, determine a second size corresponding to a size limit for a second transmission protocol and segment the data packet into segments of at most the second size, the segments being formatted using the second transmission protocol; and forward the segments to a network interface device operable to transmit the segments as Ethernet packets to an external location.

21. The computer readable non-transitory medium of claim 20, wherein the second protocol is a transmission control protocol (TCP) or a user datagram protocol (UDP).

22. The computer readable non-transitory medium of claim 20, wherein the data packet is received from an application executing on the guest operating system.

23. The computer readable non-transitory medium of claim 20, wherein the segments are framed as Ethernet frames at the bottom transmit-side conversion layer or at the network interface card.

24. The computer readable non-transitory medium of claim 20, wherein determining a maximum packet size comprises contacting a discovery service for a transmission path.

25. The computer readable non-transitory medium of claim 20, wherein segmenting the data packet into segments at the host device is performed at least in part using a driver for the network interface device.

\* \* \* \* \*